United States Patent
Yamakawa et al.

(10) Patent No.: US 7,156,523 B2
(45) Date of Patent: Jan. 2, 2007

(54) PROJECTOR

(75) Inventors: Hidemasa Yamakawa, Matsumoto (JP); Joji Karasawa, Okaya (JP); Masafumi Sakaguchi, Suwa (JP); Kanji Yoshida, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/218,835

(22) Filed: Sep. 6, 2005

(65) Prior Publication Data
US 2006/0050396 A1    Mar. 9, 2006

(30) Foreign Application Priority Data
Sep. 8, 2004    (JP)    ............... 2004-260562

(51) Int. Cl.
G03B 21/26    (2006.01)
G02B 3/00    (2006.01)

(52) U.S. Cl. ............... 353/34; 353/82; 353/101; 359/651; 359/702; 359/703; 359/811; 359/818; 359/822

(58) Field of Classification Search ........ 359/649–651, 359/702, 703, 811, 818, 822; 353/31, 33, 353/34, 37, 49, 81, 82, 99, 101
See application file for complete search history.

(56) References Cited

U.S. PATENT DOCUMENTS

| | | | | |
|---|---|---|---|---|
| 6,478,430 B1* | 11/2002 | Wada | ............ | 353/31 |
| 6,882,480 B1* | 4/2005 | Yanagisawa | ............ | 353/33 |
| 2003/0007133 A1* | 1/2003 | Notagashira | ............ | 353/31 |
| 2003/0174288 A1* | 9/2003 | Nakano | ............ | 353/31 |
| 2003/0189693 A1* | 10/2003 | Ishino | ............ | 353/31 |
| 2004/0114111 A1* | 6/2004 | Watanabe | ............ | 353/31 |
| 2005/0001984 A1* | 1/2005 | Ishino | ............ | 353/31 |
| 2005/0001985 A1* | 1/2005 | Kitabayashi | ............ | 353/31 |
| 2005/0057727 A1* | 3/2005 | Troyer | ............ | 353/31 |

(Continued)

FOREIGN PATENT DOCUMENTS

JP    A 10-171045    6/1998

(Continued)

*Primary Examiner*—Evelyn A. Lester
(74) *Attorney, Agent, or Firm*—Oliff & Berridge, PLC

(57) ABSTRACT

Aspects of the invention can provide a projector can include an illumination device that outputs illumination light, a color separation system that divides the illumination light output from the illumination device into blue light, red light, and green light and guides the blue light, red light, and green light to first to third optical paths, respectively, and first to third light modulation devices disposed in the first to third optical paths to be illuminated by the blue light, red light, and green light. In the projector, a distance from the illumination device to the third optical modulation device can be longer than a distance from the illumination device to the first optical modulation device and a distance from the illumination device to the second optical modulation device, a relay system having a first lens disposed at the light incident side, a second lens disposed at the light exit side, and a third lens disposed between the first and second lenses can be provided in the third optical path. The third lens can have a reference part as reference when the third lens is positioned along an optical axis of the third optical path, and the color separation system has a fixing part that positions the third lens in the third optical path by locking the reference part and can adjust the position of the third lens in the optical axis direction in a step-by-step manner by a combination way when the reference part is locked in the fixing part.

8 Claims, 12 Drawing Sheets

U.S. PATENT DOCUMENTS

| | | | |
|---|---|---|---|
| 2005/0057728 A1* | 3/2005 | Notagashira | 353/31 |
| 2005/0068505 A1* | 3/2005 | Momose et al. | 353/34 |
| 2005/0174542 A1* | 8/2005 | Kawai et al. | 353/31 |
| 2006/0126033 A1* | 6/2006 | Fujisawa et al. | 353/99 |

FOREIGN PATENT DOCUMENTS

| | | |
|---|---|---|
| JP | A 11-242184 | 9/1999 |
| JP | A 2001-222002 | 8/2001 |
| JP | A 2003-287804 | 10/2003 |
| WO | WO 94/22042 | 9/1994 |
| WO | A 11-64977 | 3/1999 |

* cited by examiner

F I G. 3
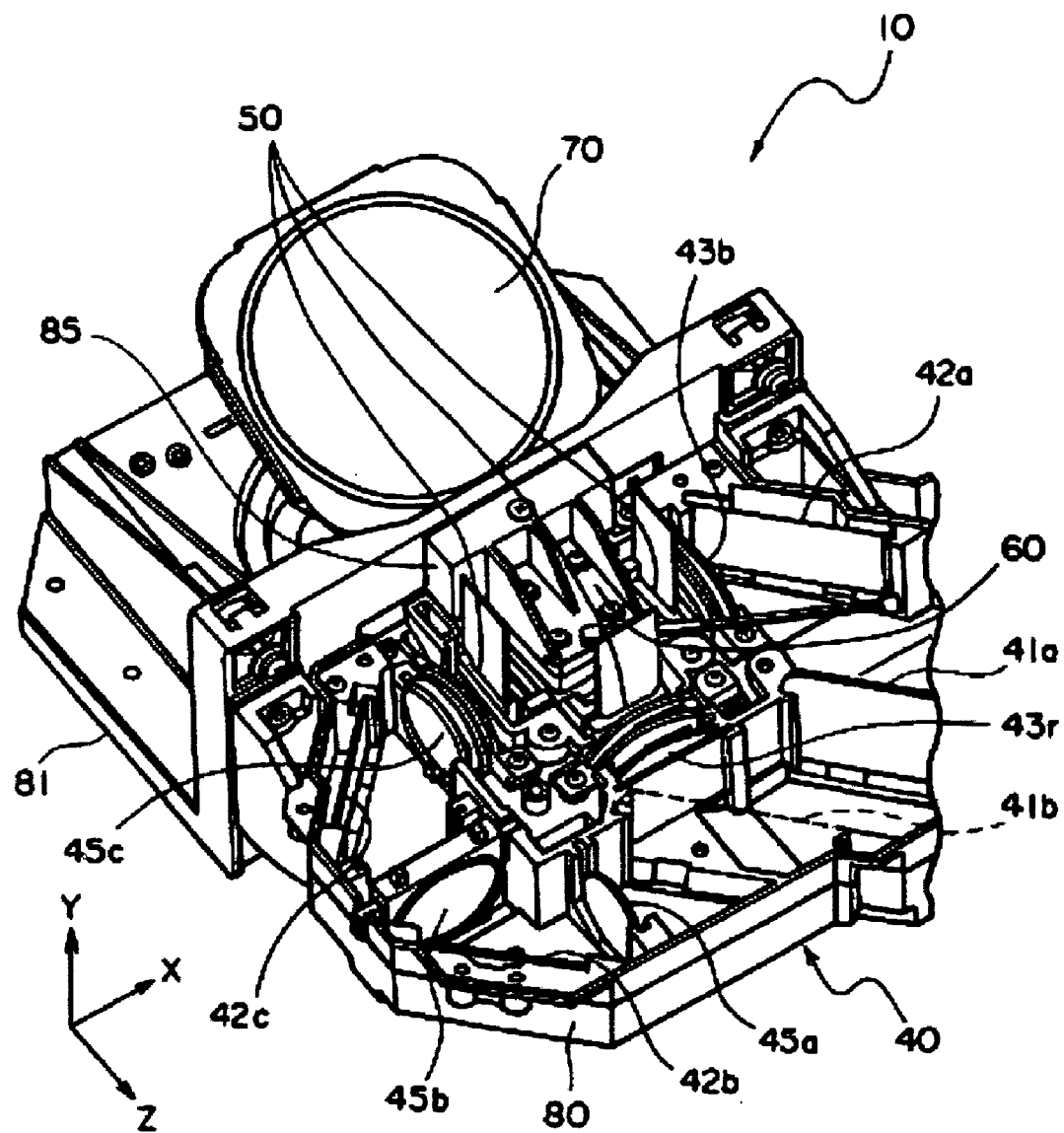

F I G. 4
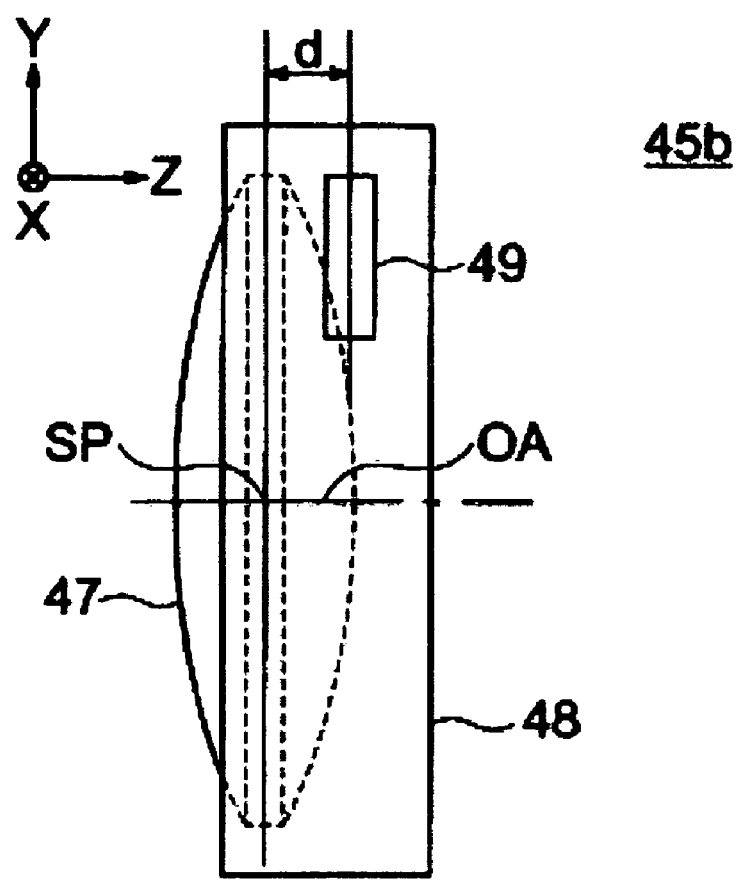

F I G. 7
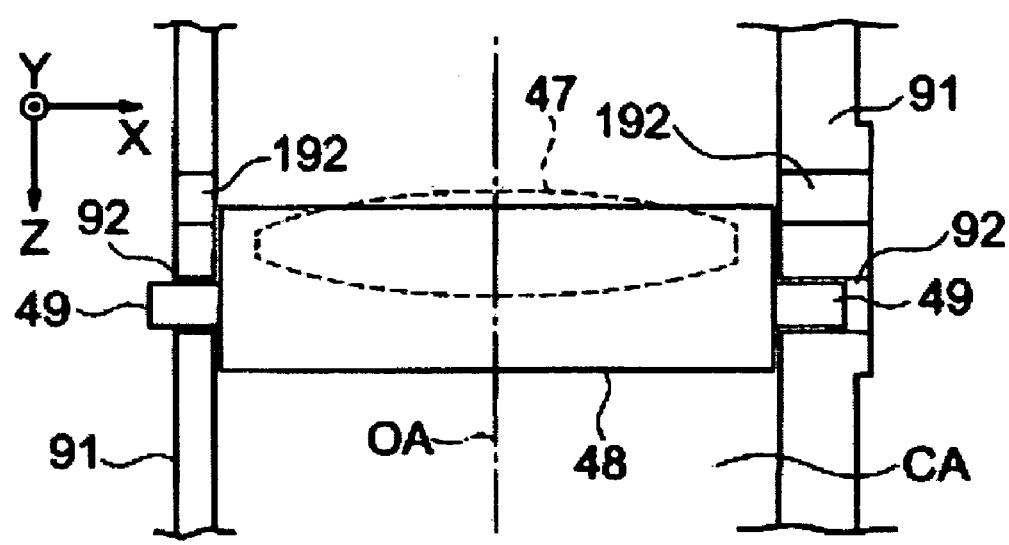

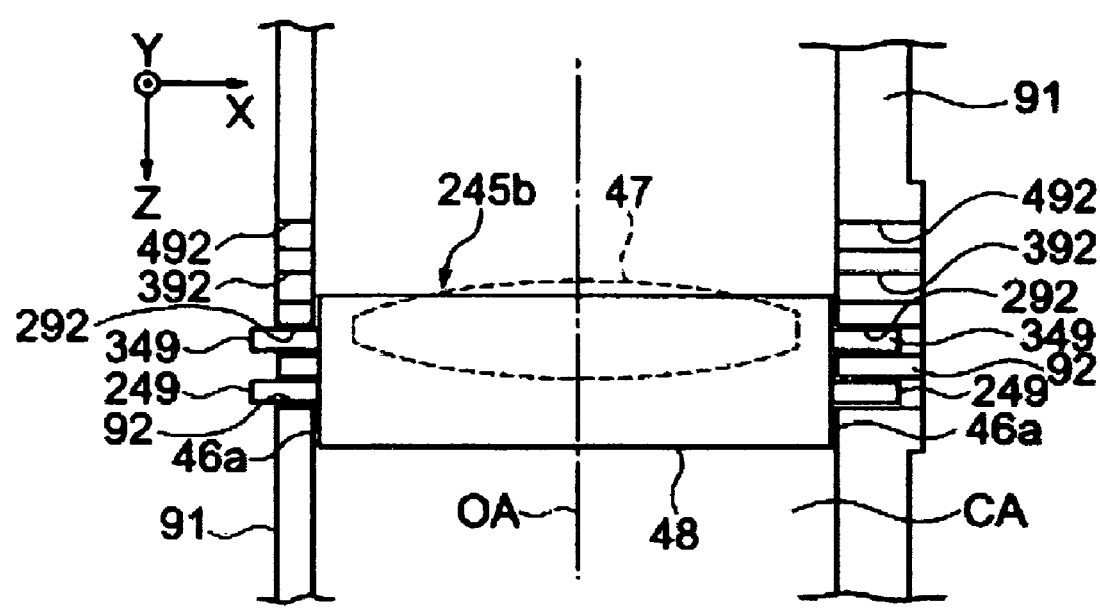
F I G. 10

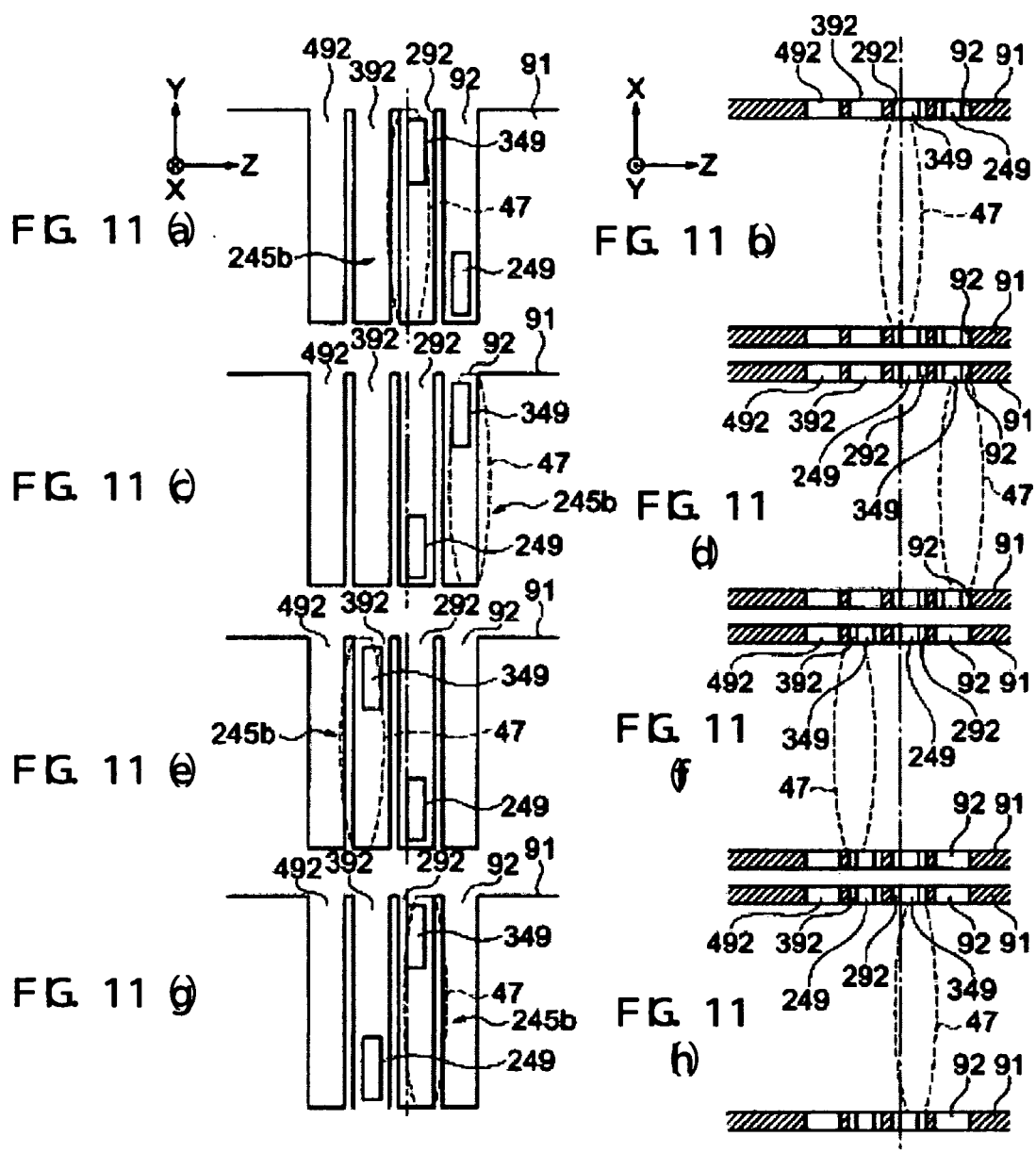

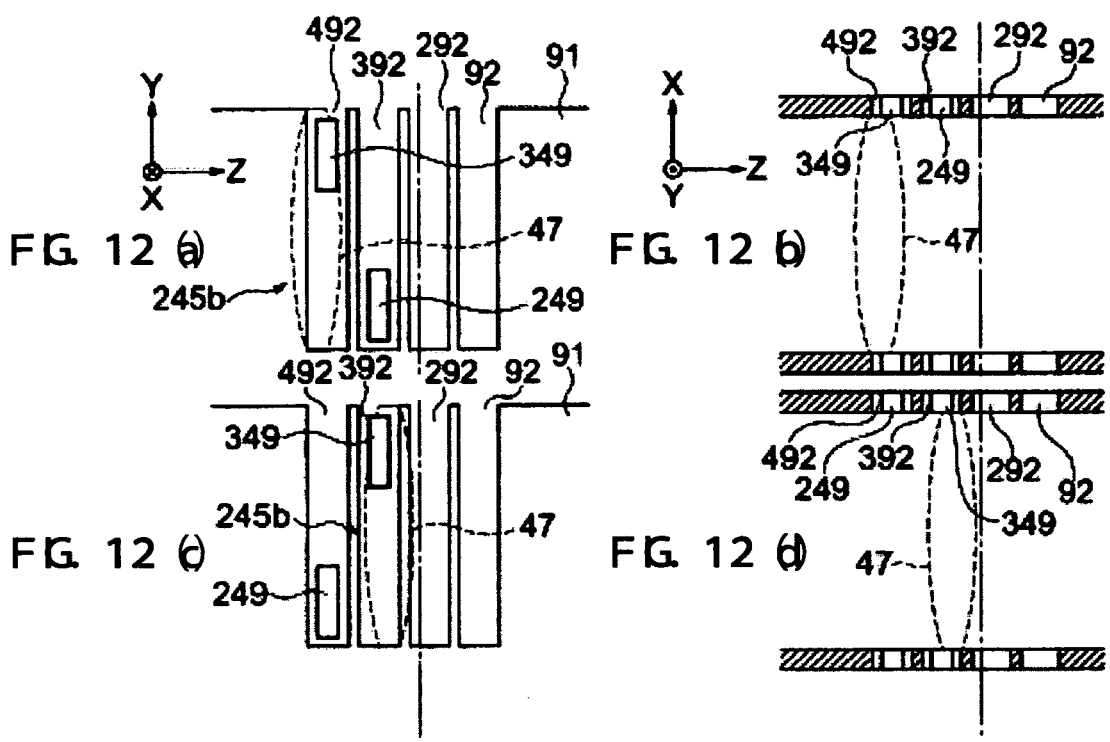

PROJECTOR

This application claims the benefit of Japanese Patent Application No. 2004-260562, filed Sep. 8, 2004. The entire disclosure of the prior application is hereby incorporated by reference herein in its entirety.

BACKGROUND

Aspects of the invention can relate to a projector for projecting images using a light modulation device, such as a liquid crystal panel. As a related art illumination device for a liquid crystal panel incorporated in a projector, there is a device that separates a light source beam from a white light source into three colors and, provided with a relay system in the illumination light path of red of them, compensates differences in optical lengths from remaining green and blue. See, for example, Japanese Patent Application Publications Nos. Hei-10-171045, 2003-287804, and Hei-11-242184. Of these, in one illumination device, the relay system can be formed by four lenses and an adjustment mechanism of a slotted hole and an adjustment screw is provided to one lens at the central side, and thereby, the lens is made vertically and horizontally movable within a vertical surface orthogonal to the light path. See Publication No. Hei-11-242184.

Further, as another illumination device for a liquid crystal panel, there is a device that separates a light source beam from a white light source into three colors and, provided with a relay system in the illumination light path of blue of them, compensates differences in optical lengths from remaining two colors. See, for example, Japanese Patent Application Publication No. Hei-11-64977. In this projector, effective utilization of blue light is intended by making the central lens of three lenses forming the relay system movable in an optical axis direction, for example, for scaling up and down of the size of the illumination area for the liquid crystal panel.

Further, as another related art illumination device for a liquid crystal panel, there is a device that separates a light source beam from a white light source into three colors and, provided with light guiding device, such as a relay system in the illumination light path of green of them, compensates differences in optical lengths from remaining two colors. See, for example, see International Publication No. WO 94/22042.

However, in the illumination device provided with a relay system in the illumination light path of red, because a high-pressure mercury lamp or the like is used as the light source, the red becomes weaker compared to the other colors, and sometimes the white balance can not be suitably adjusted. In such a case, the white balance can be achieved by signal processing of adjusting brightness values of image signals to be input to the liquid crystal panel, however, there can be a problem that the brightness and contrast of the image is reduced.

Further, in the related art illumination device in which the lens provided in the red light path is made vertically and horizontally movable within a vertical surface orthogonal to the light path, the effect is only that the illumination light can be suitably entered into the illumination area of the liquid crystal panel.

Further, in the related art illumination device in which the lens provided in the red light path is made vertically and horizontally movable in the optical axis direction, the loss of blue light, the amount of light of which is apt to be insufficient, can be reduced and the waste of the illumination light can be prevented, however, the bias of the white balance due to the luminescence property of the high-pressure mercury lamp or the like can not be resolved in a positive manner.

Further, in the related art illumination device provided with a relay system in the illumination light path of green, because the white balance often varies largely with respect to each product due to the luminescence property of the high-pressure mercury lamp or the like, signal processing for adjusting brightness values of image signals to be input to the liquid crystal panel larger is required.

SUMMARY

An aspect of the invention can provide a projector capable of achieving high-brightness and natural white balance while minimizing signal processing utilizing brightness values even in the case of using a lamp source with variations in spectrum characteristics, such as a high-pressure mercury lamp.

A projector according to the invention can be a projector including (a) an illumination device that outputs illumination light; (b) a color separation system that divides the illumination light output from the illumination device into blue light, red light, and green light and guides the blue light, red light, and green light to first to third optical paths, respectively; and (c) first to third light modulation devices disposed in the first to third optical paths to be illuminated by the blue light, red light, and green light. In the exemplary projector, (b-1) a distance from the illumination device to the third optical modulation device is longer than a distance from the illumination device to the first optical modulation device and a distance from the illumination device to the second optical modulation device, (b-2) a relay system having a first lens disposed at the light incident side, a second lens disposed at the light exit side, and a third lens disposed between the first and second lenses is provided in the third optical path, (b-3) the third lens has a reference part as reference when the third lens is positioned along the optical axis of the third optical path, and (b-4) the color separation system has a fixing part that position the third lens in the third optical path by locking the reference part and can adjust the position of the third lens in the optical axis direction in a step-by-step manner by a combination way when the reference part is locked in the fixing part.

In the exemplary projector, since the relay system is disposed in the third optical path for green light, the loss of green light is apt to be generated, however, for the lamp light source with a large amount of green light, a rather advantageous effect is provided for achieving natural white balance. Here, the green light LG has relatively high visibility and a large influence on white balance, however, the position of the third lens that forms the relay optical system in the optical axis direction can be adjusted in a step-by-step manner, and thereby, the illuminance on the third light modulation device for green light can be adjusted nearly to a target value by appropriately moving the third lens so as to achieve the target white balance. Since the third lens is located at the central side in the relay system, illuminance distribution on the third light modulation device is hardly affected when the third lens is moved in the optical axis direction. Further, in the step-by-step positional adjustment of the third lens, accurate adjustment of white balance can be difficult, however, more accurate white balance can be achieved by simultaneously using signal processing of adjusting brightness values of the image signals to be supplied to the third modulation device etc. In this case, the reduction of the brightness and contrast of images can be suppressed or reduced.

Further, according to a specific aspect or mode of the invention, in the projector, the reference part is located in a position shifted from an optical symmetric point of the third lens by a predetermined distance with respect to the optical axis direction. In this case, by reversing the incident and exit surfaces of the third lens, the position of the reference part relative to the third lens in the optical axis direction changes and the collection condition by the third lens can be changed in two steps.

Further, according to a specific aspect of the invention, the third lens can be a lens main body into which the green light is entered and a holder that holds the lens main body and has the reference part provided, and the holder positions the lens main body to the fixing part via the reference part in a pair of states in which the incident and exit surfaces of the lens main body are reversed. In this case, when the holder is mounted to the fixing part, the position of the third lens can be changed in two steps only by reversing the front and rear of the holder.

Further, according to a specific aspect of the invention, the reference part has plural reference members provided in positions spaced from an optical symmetric point of the third lens at predetermined intervals with respect to the optical axis direction. In this case, depending on which of the plural reference members are used for mounting the third lens to the fixing unit, the position of the third lens in the optical axis direction changes in multiple steps, and the collection state by the third lens can be changed in multiple steps.

Further, according to another specific aspect of the invention, the fixing part has plural reference members provided in positions spaced at predetermined intervals in the third optical path. In this case, depending on to which of the plural fixing members the third lens is mounted via the reference part, the position of the third lens in the optical axis direction changes in multiple steps, and the collection state by the third lens can be changed in multiple steps.

Further, according to another specific aspect of the invention, the reference point and the fixing point have shapes that can fit with each other and are relatively positioned by the fitting. In this case, accurate positioning can be performed by a simple mechanism.

Further, according to another specific aspect of the invention, the illumination device can have a high-pressure mercury lamp as a light source. In this case, since the amount of green light has a tendency to become larger compared to those of the red light and blue light, even when the loss in the light amount is generated by the setting of the illumination range of green light for moving the third lens in the optical axis direction or the like, it does not work against the white balance adjustment. Further, in the case of the high-pressure mercury lamp, the green light has relatively large visibility and variations in the relative light amount and the transmittance of the third light modulation device is apt to vary, however, the white balance can be set to nearly a target value by the step-by-step positional adjustment of the third lens, and thereby, the brightness and contrast of the image is never sacrificed.

Further, according to another aspect of the invention, the projector can further includes a light combining system that combines image lights of the respective colors obtained by modulating the blue light, red light, and green light with the first to third modulation devices and a projection system that projects the combined light output from the light combining system. In this case, a color image combined by the light combining system can be projected by the projection system in a desired size on a screen.

BRIEF DESCRIPTION OF THE DRAWINGS

The invention will be described with reference to the accompanying drawings, wherein like numbers reference like elements, and wherein:

FIG. 3 is a perspective view for explanation of specific fixation of the color separation system, the light modulation part, etc.;

FIG. 4 is a side view for explanation of the structure of a lens 45b;

FIG. 7 is a plan view for explanation of mounting of a lens in the second exemplary embodiment;

FIG. 10 is a plan view for explanation of mounting of the lens in the third exemplary embodiment;

FIGS. 11A to 11H are diagrams for explanation of a position changing method of the lens; and FIGS. 12A to 12D are diagrams for explanation of the position changing method of the lens.

DETAILED DESCRIPTION OF PREFERRED EMBODIMENTS

Hereinafter, best modes for implementing the invention will be described. In the following description, an axis parallel with the traveling direction of light is set as Z-axis and two axes perpendicular to the axis are set as X-axis and Y-axis. Further, the direction opposite to the traveling direction of light is set as a positive direction (+Z direction) and the traveling direction of light is set as a negative direction (−Z direction).

[First Embodiment]

Figure 1:
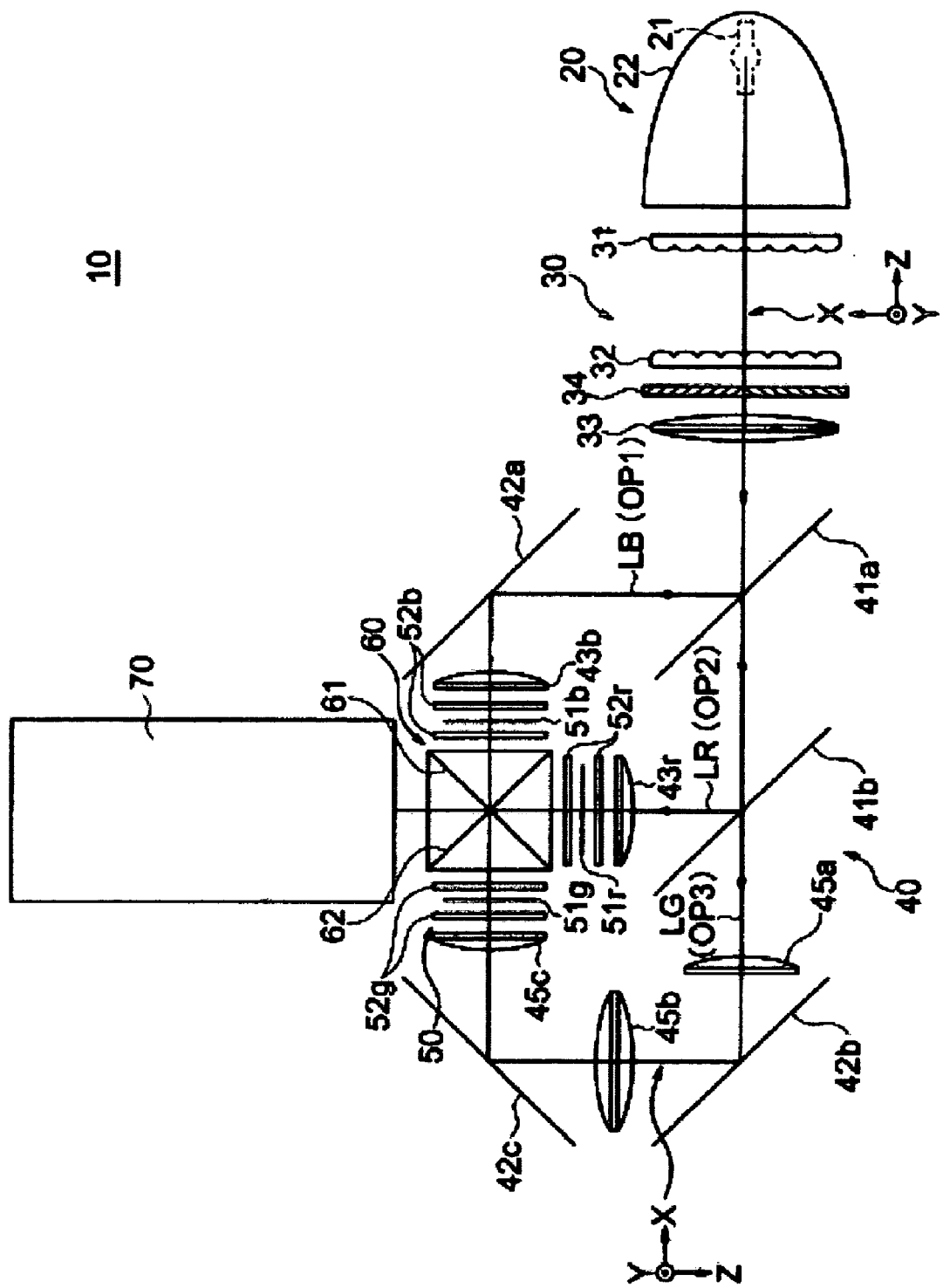
FIG. 1 is a diagram for explanation of an optical system of a projector according to the first exemplary embodiment.

FIG. 1 is a diagram for explanation of an overall configuration of a projector according to a first exemplary embodiment of the invention. This projector 10 can include light source unit 20 that emits illumination light, a uniformization system 30 that uniformizes the illumination light from the light source unit 20, a color separation system 40 that separates the illumination light that has passed through the uniformization system 30 into three colors of red, green, and blue, a light modulation part 50 to be illuminated by the illumination lights of the respective colors output from the color separation system 40, a cross dichroic prism 60 as a light combining system for combining the modulated lights of the respective colors from the light modulation part 50, and a projection lens 70 as a projection system for projecting the image light that has passed through the cross dichroic prism 60 onto a screen (not shown). Of these, the light source unit 20 and the uniformization system 30 form an illumination device that outputs the uniformized illumination light to the color separation system 40.

Here, the light source unit 20 can include a lamp main body 21 as a light emitter having a substantially point-like form, and a concave mirror 22 having a parabolic form for collimating a light source beam output from the lamp main body 21. Here, the lamp main body 21 is a lamp light source, such as a high-pressure mercury lamp, for example, and emits a nearly white light source beam. Further, the concave mirror 22 reflects a beam emitted from the lamp main body 21 and allows the beam as parallel luminous flux to enter the uniformization system 30. By the way, in place of the concave mirror 22 having a parabolic form, a concave mirror not having the parabolic form, but a spherical or ellipsoidal surface may be used. In the case where such a concave mirror is used, parallel luminous flux can be output from the light source unit 20 by disposing a parallelizing lens between the concave mirror 22 and uniformization system 30.

The uniformization system 30 can include a pair of fly-eye systems 31 and 32 for wavefront splitting, a superimposing lens 33 for superimposing the wavefront-split lights, and a polarization conversion member 34 that converts the illumination light into a predetermined polarization component. The pair of fly-eye systems 31 and 32 are formed by plural element lenses arranged in matrix forms and these element lenses split the illumination light from the light source unit 20 and independently collect and diverge the lights. The polarization conversion member 34 converts the illumination light output from the fly-eye systems 31 and 32 into one kind of polarized light (e.g., only S-polarized light component perpendicular to the paper surface of FIG. 1) and supplies the light to the next stage system. The superimposing lens 33 appropriately converges the illumination light that has passed through the polarization conversion member 34 as a whole, and enables the superimposition illumination to the light modulation devices of the respective colors provided in the light modulation part 50. That is, the illumination light that has passed through both fly-eye systems 31 and 32 and the superimposing lens 33 passes through the color separation system 40, which will be described as below in detail, and uniformly and superimposingly illuminates image formation areas of the light modulation devices of the respective colors, i.e., liquid crystal panels 51b, 51r, and 51g of the respective colors that form the light modulation part 50.

The color separation system 40 can include first and second dichroic mirrors 41a and 41b, a reflection mirrors 42a, 42b, and 42c, and field lenses 43r and 43b, first to third lenses 45a, 45c, and 45b. The first dichroic mirror 41a reflects blue light LB of three colors of red, green, and blue (R, G, and B) and transmits green light LG and red light LR. Further, the second dichroic mirror 41b reflects the red light LR of the entering green light LG and red light LR and transmits the green light LG. In the color separation system 40, illumination light from the light source unit 20 and the uniformization system 30 first enters the first dichroic mirror 41a. The blue light LB reflected by the first dichroic mirror 41a is guided to a first optical path OP1, passes through the reflection mirror 42a, and enters the field lens 43b for adjusting the incident angle. Further, the red light LR transmitted through the first dichroic mirror 41a and reflected by the second dichroic mirror 41b is guided to a second optical path OP2 and enters the field lens 43r. Furthermore, the green light LG that has passed through the second dichroic mirror 41b is guided to a third optical path OP3 and passes through the lenses 45a, 45b, and 45c via the reflection mirrors 42b and 42c in between. A relay system formed by these lenses 45a, 45b, and 45c is disposed in the third optical path OP3 of green, which has the longest distance of the optical path from the light source unit 20 to the liquid crystal panels 51b, 51r, and 51g of the respective colors. The relay system transmits an image of the first lens 45a through the third lens 45b to the second lens 45c with almost no change, and thereby, prevents the reduction of utilization efficiency of light due to diffusion of light.

The light modulation part 50 can include three liquid crystal panels 51b, 51r, and 51g that illumination lights LB, LR, and LG of three illumination lights enter, respectively, and three pairs of polarization filters 52b, 52r, and 52g located so as to sandwich the respective liquid crystal panels 51b, 51r, and 51g. Here, for example, the liquid crystal panel 51b for blue light LB and the pair of polarization filters 52b and 52b that sandwich the panel form a liquid crystal light valve for brightness modulation of illumination light in a two-dimensional manner. Similarly, the liquid crystal panel 51r for red light LR and the corresponding polarization filters 52r and 52r form a liquid crystal light valve, and the liquid crystal panel 51g for green light LG and the corresponding polarization filters 52g and 52g form a liquid crystal light valve.

In the light modulation part 50, the blue light LB that has been guided to the first optical path OP1 enters the irradiated surface of the liquid crystal panel 51b via the field lens 43b. The red light LR that has been guided to the second optical path OP2 enters the irradiated surface of the liquid crystal panel 51r via the field lens 43r. The green light LG that has been guided to the third optical path OP3 enters the irradiated surface of the liquid crystal panel 51g via the lenses 45a, 45b, and 45c. The respective liquid crystal panels 51b, 51r, and 51g are non-emissive light modulation devices for varying the spatial distribution of the incident illumination light in the polarization direction, and the polarization states of the respective color lights LB, LR, and LG that have entered the respective liquid crystal panels 51b, 51r, and 51g, respectively, are adjusted in units of pixels according to drive signals or image signals input as electric signals to the respective liquid crystal panels 51b, 51r, and 51g. Simultaneously, the polarization directions of the illumination lights entering the respective liquid crystal panels 51b, 51r, and 51g are adjusted by the polarization filters 52b, 52r, and 52g, and modulated light in a predetermined polarization direction is extracted from the lights output from the respective liquid crystal panels 51b, 51r, and 51g.

The cross dichroic prism 60 is a light combining member and has a reflection film 61 (e.g., a dielectric multilayer film) for blue light reflection and a reflection film 62 (e.g., a dielectric multilayer film) for green light reflection orthogonal to each other. The cross dichroic prism 60 reflects the blue light LB from the liquid crystal panel 51b by the reflection film 61 and allows the light to exit toward the right side in the traveling direction, allows the red light LR from the liquid crystal panel 51r to travel straight and exit via the reflection films 61 and 62, and reflects the green light LG from the liquid crystal panel 51g by the reflection film 62 and allows the light to exit toward the left side in the traveling direction. The image light thus combined by the cross dichroic prism 60 is projected through the projection lens 70 as a color image onto a screen (not shown) with a suitable magnifying power.

Figure 2:
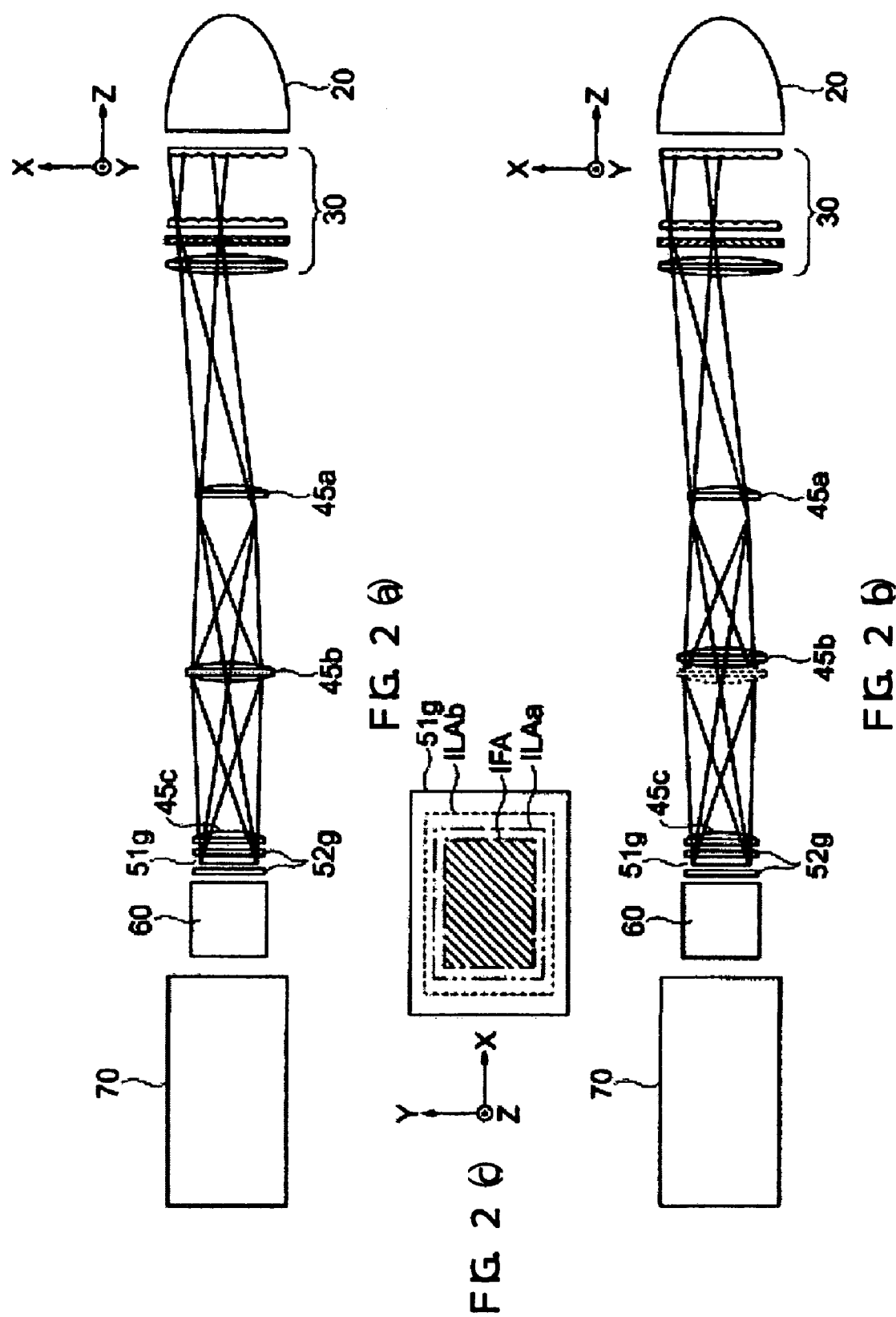
FIG. 2A shows a luminous flux of the third optical path of the projector.
FIG. 2B shows a state in which the central lens is displaced along the third optical path.
FIG. 2C is a diagram for comparison among an image formation area of the liquid crystal panel, an illumination area in the state of FIG. 2A, and an illumination area in the state of FIG. 2B.

FIGS. 2A to 2C are diagrams for explanation of collection and divergence states or the like of the luminous flux in the third optical path OP3 in the projector 10 shown in FIG. 1, and, more specifically, diagrams for explanation of a method of light amount adjustment only for green light LG. FIG. 2A shows an initial standard state, and FIG. 2B shows a state in which the central lens 45b of the relay system 45a, 45b, and 45c is displaced along the optical axis direction, i.e., the third optical path OP3. FIG. 2C is a diagram for comparison among an image formation area IFA of the liquid crystal panel 51g (shaded area surrounded by a dashed line), an illumination area ILAa in the state in FIG. 2A, and an illumination area ILAb in the state in FIG. 2B.

In the state shown in FIG. 2A, the image formation area IFA of the liquid crystal panel 51g is uniformly illuminated by the green light LG that has been output from the uniformization system 30 and passed through the lenses 45a, 45b, and 45c as shown by the double-dashed line in FIG. 2C.

On the other hand, in the state shown in FIG. 2B, similarly, the image formation area IFA of the liquid crystal panel 51g is uniformly illuminated by the green light LG that has been output from the uniformization system 30 and passed through the lenses 45a, 45b, and 45c, however, because the position of the lens 45b comes closer to the uniformization system 30 side, the illumination area ILAb larger than the illumination area ILAa in the state shown in FIG. 2A is formed. Since the light amount in the illumination area ILAa and the light amount in the illumination area ILAb are nearly equal, the illuminance of the green light LG on the image formation area IFA of the liquid crystal panel 51g is lower in the state in FIG. 2B than that in the state in FIG. 2A. In FIG. 2B, the lens shown by the dotted line shows the position of the lens 45b before displacement in FIG. 2A.

As clearly seen from above, the illuminance of the green light LG on the image formation area of the liquid crystal panel 51g can be changed by displacing the position of the lens 45b along the optical axis. That is, while the illuminance of the blue light LB and red light on the image formation areas of the liquid crystal panels 51b and 51r is not changed and kept constant, the illuminance of the green light LG on the image formation area of the liquid crystal panel 51g can be changed. Accordingly, the white balance of the image combined by being passed through the respective liquid crystal panels 51b, 51r, and 51g and projected on the screen by the projection lens 70 can be adjusted. In this case, since the movement of the lens 45b is not continuous but in steps, the illuminance of the green light LG on the image formation area of the liquid crystal panel 51g also changes in a step-by-step manner. Therefore, the white balance of the image is adjusted not in a continuous manner but in a step-by-step manner. Accordingly, in addition to the step-by-step adjustment of white balance by the movement of the lens 45b, the fine adjustment of brightness values of the image signal supplied to the liquid crystal panel 51g is performed by electric signal processing, and thereby, the white balance can be made closer to an ideal state. In this case, because the white balance is adjusted in a step-by-step manner by the movement of the lens 45b, the adjustment amount of white balance by the electric signal processing can be made smaller compared to that in the case where the white balance is adjusted only by the electric signal processing. Therefore, the reduction in brightness and contrast of images due to adjustment by the electric signal processing can be suppressed.

Generally, the green light LG has relatively high visibility and a large influence on white balance. Further, in the light source unit 20 including the lamp main body 21 of a high-pressure mercury lamp, the relative light amount of the green light LG is apt to vary. In the exemplary embodiment, since the illuminance of the green light LG on the image formation area of the liquid crystal panel 51g is adjusted utilizing the displacement of the lens 45b disposed in the third optical path OP3 of green, the white balance of the projector 10 can be efficiently adjusted. Note that, in the case of the high-pressure mercury lamp, since the light amount of the green light LG has a tendency to become larger compared to the light amounts of the blue light LB and the red light LR, even if some loss of light amount is generated when the illumination area becomes larger because of the displacement of the lens 45b, it does not work against the white balance adjustment.

Further, as a cause affecting the white balance, other than variations in relative light amounts of the lamp, variations in characteristics of the liquid crystal panel 51g and variations in wavelength selection characteristics of the dichroic mirrors 41a and 41b and the cross dichroic prism are also considered. However, according to the projector of the exemplary embodiment, regardless of various factors causing variations in light amounts of the green light LG, the white balance of the projector 10 can be set to nearly a target value and the brightness and contrast of the image is never sacrificed.

FIG. 3 is a perspective view for explanation of specific fixation of the color separation system 40, the light modulation part 50, the cross dichroic prism 60, etc. Onto a base member 80, the dichroic mirrors 41a and 41b, the lenses 45a, 45b, and 45c, the reflection mirrors 42a, 42b, and 42c, etc. that form the color separation system 40 are fixed in alignment. Further, a mount member 81 is fixed to the base member 80 and a prism unit 85 including the cross dichroic prism 60, the light modulation part 50, etc. and the projection lens 70 are supported in alignment via the mount member 81. With respect to the lens 45b, as described below, the mounting position in the optical axis direction (Z-axis direction) can be adjusted in a step-by-step manner at the time of assembly thereof. The three axes of X, Y, and Z shown in FIG. 3 are shown for optical paths near the lens 45b.

FIG. 4 is a side view for explanation of the structure of the lens 45b. Further, FIG. 5A is a plan view for explanation of the mounting condition of the lens 45b and FIG. 5B is a side view for explanation of the mounting condition.

As clearly seen from the drawings, the lens 45b can include a lens main body 47 that the green light enters and a rectangular holder 48 that holds the lens main body 47. A pair of reference members 49 and 49 as a reference part for positioning the lens 45b are formed on side walls 46a of the holder 48. Both reference members 49 and 49 are rectangular parallel piped projections in the same shape, and formed in positions of the opposed side walls 46a of the holder 48 at the same height.

Here, with respect to the Z-direction, i.e., the optical axis OA, the position of the optical symmetric point SP of the lens 45b and the position of the center of the reference member 49 are spaced by a predetermined distance d. As described below, this is for changing the relative position of the lens main body 47 on the optical axis OA in two steps by reversing the lens 45b with respect to the optical axis OA. As a result, the relative position of the lens main body 47 will change by a distance 2d in the optical axis OA direction.

Figure 5:
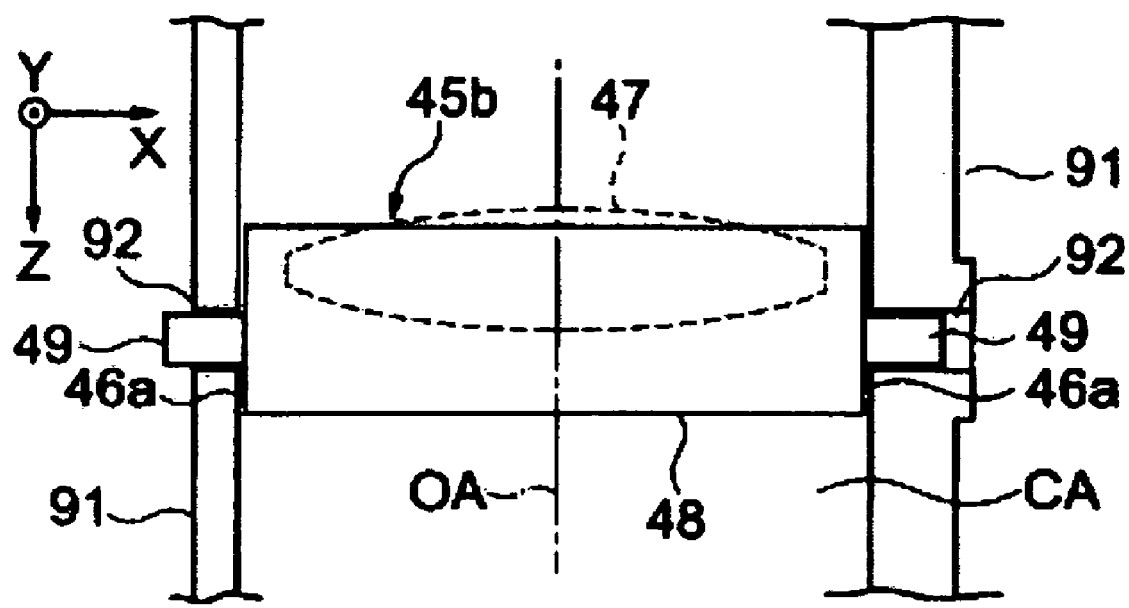
FIGS. 5A and 5B are a plan view and a side view for explanation of mounting of the lens.
Figure 5:
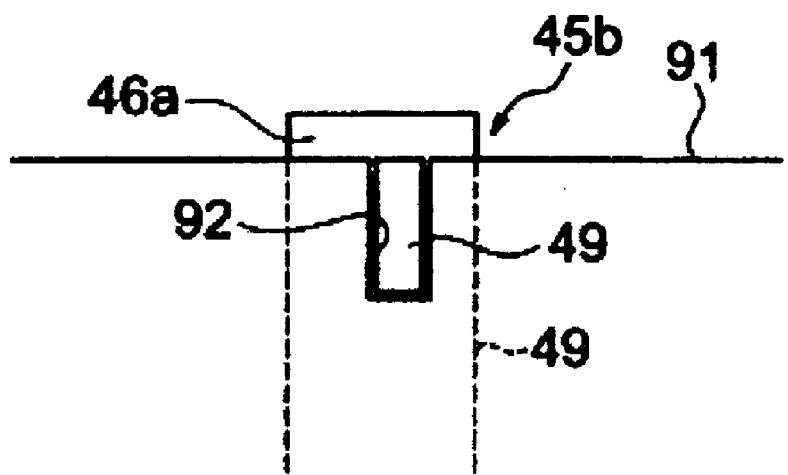

As shown in FIGS. 5A and 5B, the lens 45b is held by being guiding and fitted into the side wall of a groove CA of a chassis 91. The pair of the reference members 49 and 49 projected from the side walls 46a and 46a of the holder 48 are fitted into a pair of fixing members 92 and 92 as concave portions formed in the chassis 91 and locked therein. Thereby, the lens 45b, i.e., the lens main body 47 is aligned with respect to the respective directions of X, Y, and Z, and the lens 45b can be located in an appropriate position in the third optical path OP3. After adjustment at the time of assembly, the lens 45b is permanently fixed to the chassis 91 between the reference members 49 and 49 and the fixing members 92 and 92 by filling an adhesive, for example. In the case of using screws or the like in place of an adhesive, the reference members 49 and 49 can be separably fixed to the chassis 91. Here, the chassis 91 into which the lens 45b is fitted forms part of the base member 80 shown in FIG. 3.

Figure 6:
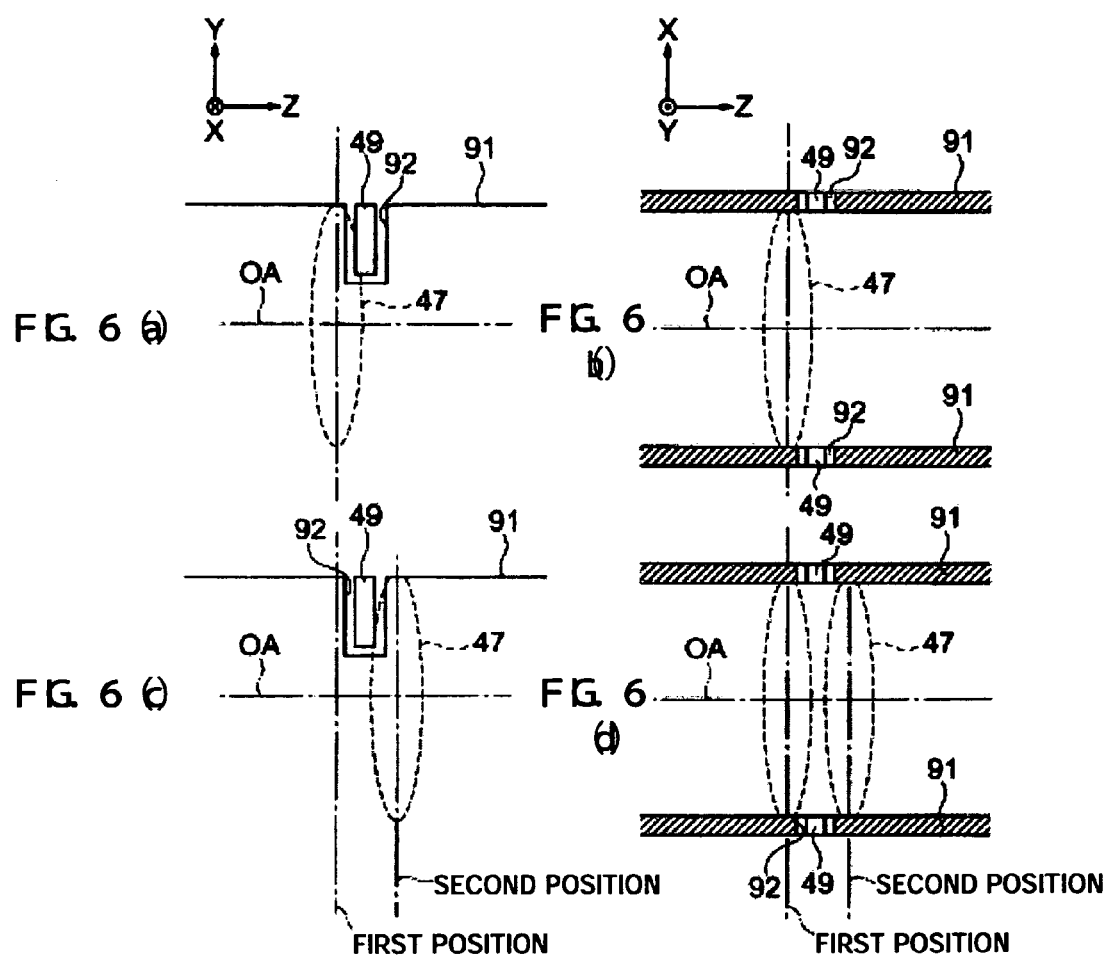
FIGS. 6A to 6D are diagrams for explanation of a position changing method of the lens.

FIGS. 6A to 6D are diagrams for conceptual explanation of a position changing method of the lens 45b. FIGS. 6A and 6B are a side view and a plan view for explanation of the condition of the lens main body 47 before positional change, and FIGS. 6C and 6D are a side view and a plan view for explanation of the condition of the lens main body 47 after positional change. In the case shown in FIGS. 6A and 6B, the lens main body 47 is located at −Z side, i.e., the light source unit 20 side of the reference members 49 and 49 fitted in the fixing members 92 and 92 provided in the chassis 91. The central position of the lens main body 47 at this time is given as the first position. Then, the lens 45b is reversed and mounted to the chassis 91 into the condition shown in FIGS. 6C and 6D. In the case shown in FIGS. 6C and 6D, the lens main body 47 is located at +Z side, i.e., the liquid crystal panel 51g side of the reference members 49 and 49 fitted in the fixing members 92 and 92 provided in the chassis 91. The central position of the lens main body 47 at this time is given as the second position.

The method can be summarized as follows. The lens main body 47 can be displaced relative to the chassis 91 in one of the first position and the second position in the Z-axis direction by changing the mounting direction of the lens 45b to the chassis 91. Thereby, the illuminance of the green light LG on the image formation area of the liquid crystal panel 51g can be changed in two steps, and the white balance of the projected image can be adjusted in two steps.

As below, the operation of the projector 10 according to the exemplary embodiment will be described. The illumination light from the light source unit 20 is uniformized and the polarization direction thereof is aligned via the uniformization system 30, and then, separated into three color lights by the first and second dichroic mirrors 41a and 41b provided in the color separation system 40, and enter the corresponding liquid crystal panels 51b, 51r, and 51g as the respective color lights LB, LR, and LG, respectively. The respective liquid crystal panels 51b, 51r, and 51g are modulated by external image signals to have two-dimensional refractive index distributions and modulate the respective color lights LB, LR, and LG in units of pixels in a two-dimensional manner. Thus, the respective color lights LB, LR, and LG modulated by the respective liquid crystal panels 51b, 51r, and 51g, i.e., image lights are combined by the cross dichroic prism 60 and then enters the projection lens 70. The image light that has entered the projection lens 70 is projected onto a screen (not shown). By the way, in the projector, since the illuminance of the green light LG on the image formation area of the liquid crystal panel 51g is changed in two steps at the time of assembly of the color separation system 40 etc., the respective liquid crystal panels 51b, 51r, and 51g can be illuminated in a desired balance without using an ND filter susceptible to heat. Therefore, the white balance of the color image combined by being passed through the respective liquid crystal panels 51b, 51r, and 51g and projected onto the screen by the projection lens 70 can be simply adjusted.

As below, a projector of a second embodiment will be described. The projector of the second embodiment is formed by changing the projector of the first exemplary embodiment with respect to the position adjustment method of the relay system, and parts not particularly described have the same structures as those of the first exemplary embodiment.

FIG. 7 is a plan view for explanation of the mounting condition of the lens 45b that forms the relay system. The same signs are assigned to the same parts as those in the first exemplary embodiment and the description thereof will be omitted. In this case, with the first fixing members 92 and 92 as the first concave portions, the second fixing members 192 and 192 as the second concave portions are formed in the chassis 91. Thereby, the lens main body 47 can be displaced toward the Z-axis direction without reversing the lens 45b.

Figure 8:
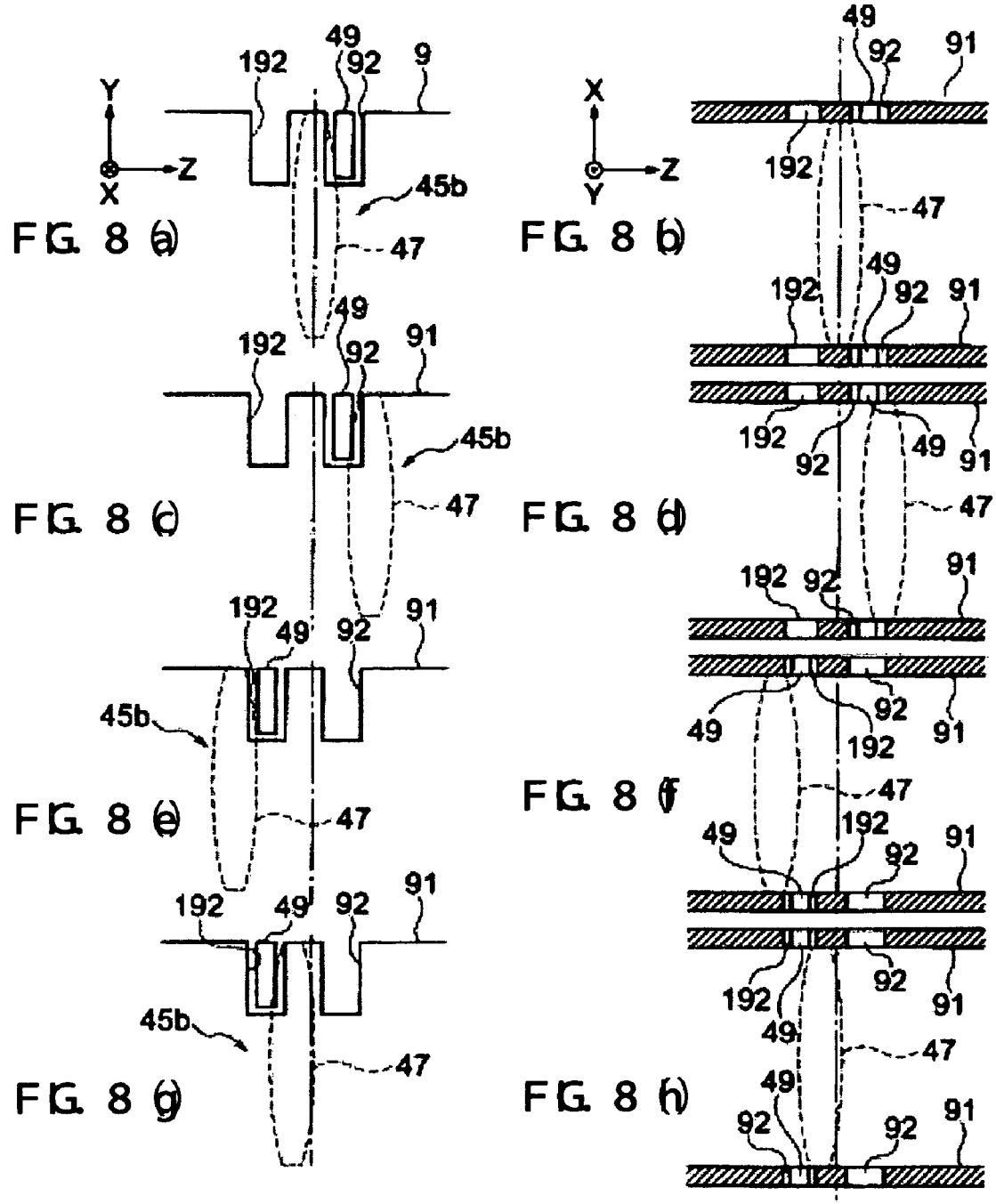
FIGS. 8A to 8H are diagrams for explanation of the position changing method of the lens.

FIGS. 8A to 8H are diagrams for conceptual explanation of a position changing method of the lens 45b. FIGS. 8A and 8B are a side view and a plan view for explanation of the condition in which the lens main body 47 is located in the first position before positional change. Further, FIGS. 8C and 8D are a side view and a plan view for explanation of the condition in which the lens main body 47 is located in the second position after positional change, FIGS. 8E and 8F are a side view and a plan view for explanation of the condition in which the lens main body 47 is located in the third position after positional change, and FIGS. 8G and 8H are a side view and a plan view for explanation of the condition in which the lens main body 47 is located in the fourth position after positional change.

As shown in FIG. 8A etc., the condition in which the lens main body 47 is located in the first position corresponds to FIG. 6A etc. The lens 45b is fixed by the first fixing members 92 and 92 provided in the chassis 91 and the lens main body 47 is aligned and held at −Z side of the reference members 49 and 49. Further, as shown in FIG. 8C etc., the condition in which the lens main body 47 is located in the second position corresponds to FIG. 6C etc. The lens 45b is fixed by the first fixing members 92 and 92 provided in the chassis 91 and the lens main body 47 is aligned and held at +Z side of the reference members 49 and 49.

As shown in FIG. 8E etc., in the case where the lens main body 47 is located in the third position, the lens 45b is fixed by the second fixing members 192 and 192 provided in the chassis 91 and the lens main body 47 is aligned and held at −Z side of the reference members 49 and 49. Further, as shown in FIG. 8G etc., in the case where the lens main body 47 is located in the fourth position, the lens 45b is fixed by the second fixing members 192 and 192 provided in the chassis 91 and the lens main body 47 is aligned and held at +Z side of the reference members 49 and 49.

The method can be summarized as follows. The lens main body 47 can be displaced in one of the first position to the fourth position in the Z-axis direction in a step-by-step manner by changing the mounting direction of the lens 45b to the chassis 91 or switching the use between the first fixing members 92 and 92 and the second fixing members 192 and 192. Thereby, the illuminance of the green light LG on the image formation area of the liquid crystal panel 51g can be changed in four steps, and the white balance of the projected image can be adjusted in four steps. By the way, the above first to fourth positions may be provided at equal intervals, or the modification for making the interval between the first position and the fourth position larger or smaller than the interval between the first position and the second position.

As below, a projector of the third exemplary embodiment will be described. The projector of the third exemplary embodiment is formed by changing the projector of the first exemplary embodiment with respect to the position adjustment method of the relay system, and parts not particularly described have the same structures as those of the first exemplary embodiment.

Figure 9:
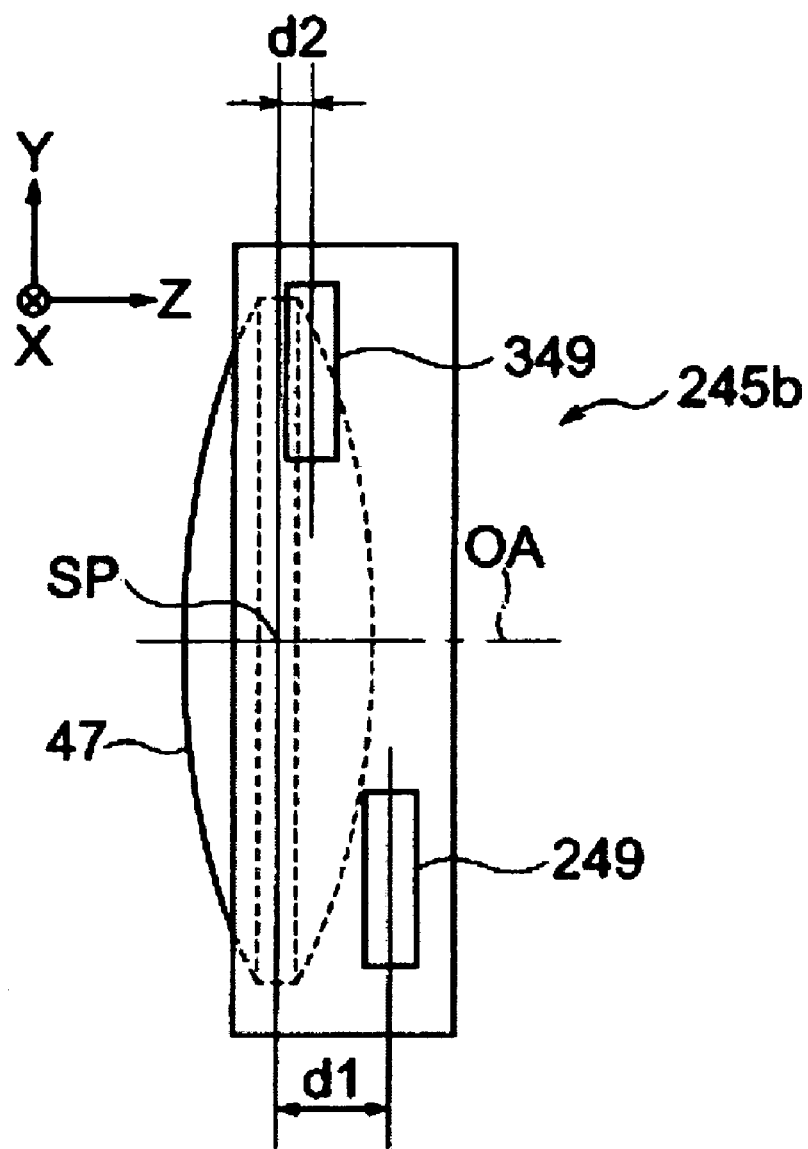
FIG. 9 is a diagram for explanation of a structure of a lens in the third exemplary embodiment.

FIG. 9 is a side view for explanation of the structure of a lens 245b that forms the relay system, and FIG. 10 is a plan view for explanation of the mounting condition of the lens 245b. The same signs are assigned to the same parts as those in the first exemplary embodiment and the description thereof will be omitted.

In this case, on the opposed side walls 46a of the holder 48 of the lens 245b, first reference members 249 and 249 greatly shifted in the optical axis OA direction from the center of the lens main body 47 and second reference members 349 and 349 slightly shifted in the optical axis OA direction from the center of the lens main body 47 are provided. The central position of the first reference member 249 is spaced from the position of the optical symmetric point SP of the lens 245b by a distance d1 in the Z-axis direction. Further, the central position of the second reference member 349 is spaced from the position of the optical symmetric point SP of the lens 245b by a distance d2 in the Z-axis direction. As a result, the relative position of the lens main body 47 on the optical axis OA can be changed in two steps by reversing the lens 245b with respect to the optical axis OA direction, and the resulting relative position of the lens main body 47 will change in the optical axis OA by a distance (d1+d2)/2.

Further, in this case, with the first fixing members 92 and 92, the second to fourth fixing members 292, 292, 392, 392, 492, and 492 are formed in the chassis 91 at equal intervals in the Z-axis direction. Thereby, the lens main body 47 can be displaced in the Z-axis direction in three steps without reversing the lens 245b.

FIGS. 11A to 11H are diagrams for conceptual explanation of a position changing method of the lens 245b. FIGS. 11A and 11B are a side view and a plan view for explanation of the condition in which the lens main body 47 is located in the first position before positional change. Further, FIGS. 11C and 11D are a side view and a plan view for explanation of the condition in which the lens main body 47 is located in the second position after positional change, FIGS. 11E and 11F are a side view and a plan view for explanation of the condition in which the lens main body 47 is located in the third position after positional change, and FIGS. 11G and 11H are a side view and a plan view for explanation of the condition in which the lens main body 47 is located in the fourth position after positional change. Furthermore, FIGS. 12A and 12B are a side view and a plan view for explanation of the condition in which the lens main body 47 is located in the fifth position after positional change and FIGS. 12C and 12D are a side view and a plan view for explanation of the condition in which the lens main body 47 is located in the sixth position after positional change.

As shown in FIG. 11A etc., in the case where the lens main body 47 is located in the first position, the lens 245b is fixed by the first and second fixing members 92 and 292 provided in the chassis 91 and the lens main body 47 is aligned and held at −Z side of both reference members 249 and 349. Further, as shown in FIG. 11C etc., in the case where the lens main body 47 is located in the second position, the lens 245b is fixed by the first and second fixing members 92 and 292 provided in the chassis 91 and the lens main body 47 is aligned and held at +Z side of both reference members 249 and 349.

As shown in FIG. 11E etc., in the case where the lens main body 47 is located in the third position, the lens 245b is fixed by the second and third fixing members 292 and 392 provided in the chassis 91 and the lens main body 47 is aligned and held at −Z side of both reference members 249 and 349. Further, as shown in FIG. 11G etc., in the case where the lens main body 47 is located in the fourth position, the lens 245b is fixed by the second and third fixing members 292 and 392 provided in the chassis 91 and the lens main body 47 is aligned and held at +Z side of the both reference members 249 and 349.

As shown in FIG. 12A etc., in the case where the lens main body 47 is located in the fifth position, the lens 245b is fixed by the third and fourth fixing members 392 and 492 provided in the chassis 91 and the lens main body 47 is aligned and held at −Z side of both reference members 249 and 349. Further, as shown in FIG. 12C etc., in the case where the lens main body 47 is located in the sixth position, the lens 245b is fixed by the third and fourth fixing members 392 and 492 provided in the chassis 91 and the lens main body 47 is aligned and held at +Z side of the both reference members 249 and 349.

The method can be summarized as follows. The lens main body 47 can be displaced in one of the first position to the sixth position in the Z-axis direction in a step-by-step manner by changing the mounting direction of the lens 245b to the chassis 91 or switching the use of combinations of the first to fourth fixing members 92, 292, 392, and 492. Thereby, the illuminance of the green light LG on the image formation area of the liquid crystal panel 51g can be changed in six steps, and the white balance of the projected image can be adjusted in six steps.

It should be understood that this invention is not limited to the above exemplary embodiments, but can be implemented in various modes without departing from the scope of the invention. For example, the following modifications can be made.

In the projector 10 of the exemplary embodiments, the high-pressure mercury lamp is used as the light source unit 20, however, other lamps, such as a metal halide lamp can be used in place of the high-pressure mercury lamp. In this case, similarly, the positions of the lenses located in the optical path for green light can be adjusted in a step-by-step manner by combinations of the above described reference members 49, 249, and 349 and fixing members 92, 192, 292, 392, and 492, and the white balance of the illumination light from the lamp light source can be appropriately adjusted.

Further, the shape of the holder 48 for fixing the lens 45b that forms the color separation system 40 and the shapes of the reference members 49, 249, 349, etc. can be made into arbitrary shapes suitable for positioning of the lens main body 47, and shapes of the fixing members 92, 192, 292, 392, and 492 are adapted to the shapes of the reference members 49, 249, 349, etc. For example, in the case where the reference members 49, 249, and 349 are made into groove portions or concave portions, the fixing members 92, 192, 292, 392, and 492 are made into ribs or convex portions. Further, the fixing members 92, 192, etc. can be made as grooves formed in the inner wall of the chassis 91.

Further, similarly, the arrangement intervals, numbers, etc. of the reference members 49, 249, and 349 and the fixing members 92, 192, 292, 392, and 492 can be changed appropriately according to the specifications on the amounts of position adjustment, number of adjustment steps, etc. of the lenses. The reference members 49, 249, and 349 can be provided on the principal plane passing the optical symmetric point SP of the lens main body 47, however, in this case, the position is not changed when the lens is reversed and the illuminance of the green light LG on the image formation area of the liquid crystal panel 51g can not hardly be changed.

Further, the reference members 49, 249, and 349 can be formed not on the holder 48 of the lens 45b but directly on the lens main body 47. In this case, the lens main body 47 is formed by a plastic lens, for example, and the same reference members as the reference members 49, 249, and 349 are provided on the edge of the lens at the time of molding of the lens main body 47.

Further, in place of the lens 45b, or with the lens 45b, other lenses 45a etc. can be displaced in the optical axis direction in a step-by-step manner.

Further, two fly-eye systems 31 and 32 are used in order to split light from the light source unit 20 into plural partial luminous fluxes, however, it should be understood that this invention can be applied to a projector that does not use such fly-eye systems, i.e., lens arrays. Furthermore, the fly-eye systems 31 and 32 can be replaced by rod integrators.

Further, the polarization conversion member 34 that makes the light from the light source unit 20 into polarization light in a specific direction is used in the above projector 10, however, it should be understood that this invention can be applied to a projector that does not use such a polarization conversion member 34.

Further, in the above first exemplary embodiment, the example in the case where the invention is applied to a transmissive projector has been described, however, the invention can be applied to a reflective projector. Here, transmissive means a type in which light valves including liquid crystal panels transmit light, and reflective means a type in which light valves reflect light. In the case of a reflective projector, light valves can be formed only by liquid crystal panels and a pair of polarizers are not required. By the way, the light modulation devices are not limited to liquid crystal panels or the like, but light modulation devices using micromirrors, for example, may be adopted.

Further, as the projector, there is a front projector that projects images from the side at which the projection surface is observed and a rear projector that projects images from the side opposite to the side at which the projection surface is observed. The configuration of the projector shown in FIG. 1 can be applied to both.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector, comprising:
   an illumination device that outputs illumination light;
   a color separation system that divides the illumination light output from the illumination device into blue light, red light, and green light and guides the blue light, red light, and green light to first to third optical paths, respectively;
   first to third light modulation devices being disposed in the first to third optical paths to be illuminated by the blue light, red light, and green light;
   a distance from the illumination device to the third optical modulation device being longer than a distance from the illumination device to the first optical modulation device and a distance from the illumination device to the second optical modulation device;
   a relay system having a first lens disposed at a light incident side, a second lens disposed at a light exit side, and a third lens disposed between the first and second lenses being provided in the third optical path;
   the third lens having a reference part as reference when the third lens is positioned along an optical axis of the third optical path; and
   the color separation system having a fixing part that positions the third lens in the third optical path by locking the reference part and can adjust the position of the third lens in the optical axis direction in a step-by-step manner by a combination way when the reference part is locked in the fixing part.

2. The projector according to claim 1, the reference part being arranged in a position shifted from an optical symmetric point of the third lens by a predetermined distance with respect to the optical axis direction.

3. The projector according to claim 2, the third lens having a lens main body that the green light enters and a holder that holds the lens main body and has the reference part provided, and the holder positions the lens main body to the fixing part via the reference part in a pair of states in which incident and exit surfaces of the lens main body are reversed.

4. The projector according to claim 1, the reference part having plural reference members provided in positions spaced from an optical symmetric point of the third lens at predetermined intervals with respect to the optical axis direction.

5. The projector according to claim 1, the fixing part having plural reference members provided in positions spaced at predetermined intervals in the third optical path.

6. The projector according to claim 1, the reference point and the fixing point having shapes that can fit with each other and are relatively positioned by the fitting.

7. The projector according to claim 1, the illumination device having a high-pressure mercury lamp as a light source.

8. The projector according to claim 1, further comprising:
   a light combining system that combines image lights of the respective colors obtained by modulating the blue light, red light, and green light with the first to third modulation devices and a projection system that projects the combined light output from the light combining system.

* * * * *